May 26, 1959    M. JOVANOVICH ET AL    2,887,898
TRANSMISSION SHIFT CONTROL
Filed July 12, 1956    2 Sheets-Sheet 2

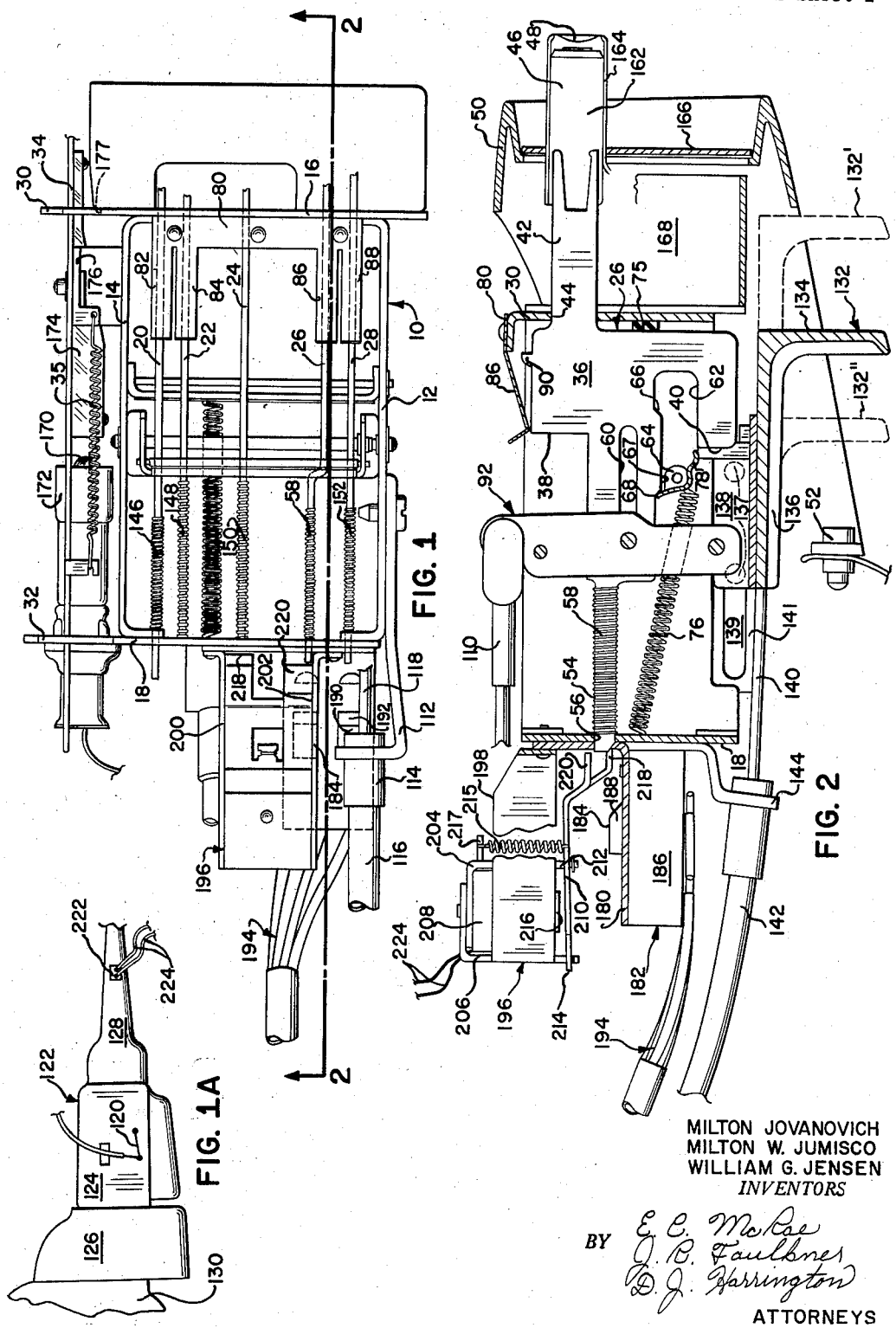

MILTON JOVANOVICH
MILTON W. JUMISCO
WILLIAM G. JENSEN
INVENTORS

BY  E. C. McRae
J. R. Faulkner
D. J. Harrington

ATTORNEYS

United States Patent Office 2,887,898
Patented May 26, 1959

2,887,898

TRANSMISSION SHIFT CONTROL

Milton Jovanovich, Birmingham, Milton W. Jumisco, Royal Oak, and William G. Jensen, Dearborn, Mich., assignors to Ford Motor Company, Dearborn, Mich., a corporation of Delaware Application July 12, 1956, Serial No. 597,425

11 Claims. (Cl. 74—476)

This invention relates generally to power transmission mechanisms and more particularly to a means for facilitating a manual selection of any of a plurality of ranges of gear reduction ratios for a multiple speed automatic transmission.

The improved transmission range selector of our instant invention finds particular utility in automic transmissions of the automotive type and it may be mounted on the dash structure of a vehicle passenger compartment to provide a maximum degree of convenience and safety in the manual selection of the various transmission drive ranges. In general, our invention is characterized by a lever assembly including an adjustable member which is mechanically coupled to a shiftable valve member within the transmission control valve body, said valve member being shifted to any of a plurality of positions upon movement of the adjustable member to initiate the varous shift patterns associated with each drive range. A separate operating position of the valve member corresponds to each drive range, and the various positions may be manually selected by moving any one of several shiftable keys within the range selector into engagement with the adjustable member. The various keys extend to the exterior of the mechanism and carry suitable push buttons to facilitate manual movement of the same.

The presently disclosed embodiment of our invention includes a separate key for the "forward" drive range, for "low" range, for "reverse" range, for "neutral" and for "park," the key for the latter being operatively associated with the transmission parking brake mechanism. By preference. we have also incorporated another key adapted to be movably shifted to release the vehicle emergency brake.

During operation of the vehicle in forward drive range under road conditions, it is considered unsafe to shift the transmission from the "forward" drive range to the "reverse" range or to actuate the parking brake. According to one principal feature of our invention, we have made provision for preventing manual movement of the reverse and park keys during operation of the vehicle at speeds greater than five to seven m.p.h., but a shift from "drive" to "reverse" at speeds less than five to seven m.p.h. may be accomplished thereby permitting the vehicle operator to extricate the vehicle from mud or snow by rocking the vehicle back and forth.

The provision of a transmission control mechanism of the type above described being a principal object of our invention, it is a further object to provide a simplified detent means wherein the push button associated with one key will remain in the engaged position until another push button assumes a fully operative position.

Another object of our invention is to provide a transmission range selector of the type above described wherein provision is made for actuating the transmission parking brake mechanism and for releasing the same with a maximum degree of convenience, and wherein means are provided for permitting the vehicle operator to apply the required parking brake releasing force.

It is a further object of our invention to provide a transmission control mechanism which is simple in construction, reliable in operation and easily serviced, and which offers a maximum degree of convenience in the manual selection of the transmission operating ranges.

In carrying forth the foregoing objects we have slidably mounted various keys in a suitable housing with the two terminal portions of each key extending through opposed sides of the housing, one end of each key carrying an appropriately marked push button. A latching mechanism is carried by the housing adjacent the other terminal portions of the park and reverse keys and it includes a lever pivotally mounted for movement into and out of the line of movement of the reverse and park keys. A solenoid type energizing device is mounted in close proximity to the lever for moving the latter upon being energized. A suitable electrical speed governor is drivably connected to the transmission tail shaft for supplying the solenoid device with a speed signal at speeds of five to seven m.p.h. and above. The electrical voltage supplied by the governor is sufficient to energize the solenoid and to actuate the lever to move the latter into the path of movement of the reverse and park keys to prevent movement of the same.

We have further mounted a starter switch on the housing with a movable contact element thereof situated in the line of movement of the neutral key. Means are provided for causing the neutral key to override the neutral position when it is manually moved toward the latter thereby causing the terminal end of the neutral key to actuate the movable contact element of the starter switch and to close the electrical circuit associated with the engine starter solenoid.

The park key of our improved selector mechanism is adapted to be actuated by a manually movable slide bar situated at a convenient location below the push button assembly and coupled to a conventional parking brake mechanism. This arrangement makes it possible for the vehicle operator to apply the required parking brake releasing force to the parking brake mechanism.

For the purpose of more particularly describing the principal features of our invention reference will be made to the accompanying drawings wherein:

Figure 1 is a plan view of the selector mechanism of our instant invention which may be mounted on the interior dash structure of the passenger compartment of an automotive vehicle, or at any other suitable location;

Figure 1A is a schematic illustration of the exterior of an automatic transmission capable of being used with the selector mechanism of our instant invention;

Figure 2 is a cross sectional view taken along section line 2—2 of Figure 1 with portions thereof being shown in elevation;

Figure 10:
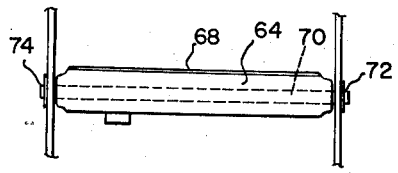
Figure 3:
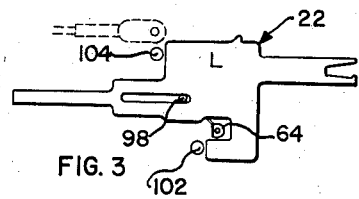
Figures 3, 4, 5, 6 and 7 are subassembly views showing the various shift keys of the selector mechanism of Figures 1 and 2, the low, direct, neutral-start, reverse and park keys being identified by the symbols L, D, N/S, R and P, respectively.
Figure 4:
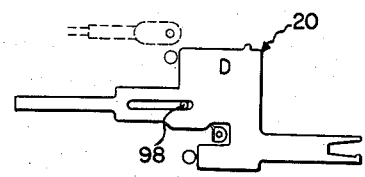
Figure 5:
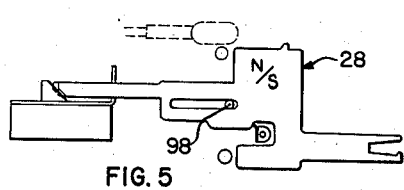

Figure 10 shows a spring loaded latch which is situated within the selector mechanism for separately retaining the various keys in an operative position. After one of the keys is moved into engagement with the cradle of Figure 9, the latch is released by any one of the other keys upon movement thereof toward an operative position thereby permitting the first key to be retracted under spring pressure.

Referring first to Figure 1, numeral 10 is used to generally designate the housing for the selector mechanism and it comprises a pair of side walls 12 and 14, a front wall 16 and a rear wall 18, said walls cooperating to define a rectangular box-like structure. Five separate keys are slidably mounted within the housing 10 with the terminal ends thereof being received through aligned apertures in the front and rear walls 16 and 18, said keys being designated by numerals 20, 22, 24, 26 and 28.

The front and rear walls 16 and 18 are formed with extensions 30 and 32 which in turn are formed with aligned apertures for slidably receiving an emergency brake release key 34 as shown. The key 34 may be mechanically connected to the actuating levers of a conventional emergency brake mechanism, not shown, and when it is manually actuated in the left hand direction, the actuating levers are caused to move to a brake releasing position under spring pressure. The key 34 may then be returned to the retracted position shown in Figure 1 by a spring 35.

Referring to Figure 2 the reverse key 26 is shown in more particular detail and it includes a main body section 36 on which are formed a pair of shoulders 38 and 40 situated in a predetermined longitudinally spaced relationship. A first extension 42 extends through an aperture 44 formed in plate 30 and is adapted to carry a suitable push button 46 at the end thereof as indicated. The end face 48 of the push button 46 may be appropriately designated by the symbol "R" so as to identify the function of the key 26.

A shroud 50 may be positioned at one end of housing 10 in order to present a pleasing appearance to the mechanism and to provide a support for securing housing 10 and the associated elements of the mechanism in an operative position. The shroud 50 may in turn be secured to the dash structure of the vehicle within the passenger compartment by suitable fastening means shown in part at 52.

Another extension 54 is formed at the other end of the key 26 and it extends through an aperture 56 formed in the end plate 18. The transverse dimension of the extension 54 is relatively small with respect to the body portion 36 and is received within a compression spring 58 which acts between the base of the extension 54 and end plate 18 for biasing the key 26 in a right hand direction, as viewed in Figure 2. A longitudinally extending slot 60 is formed in the body portion 36 and a recess 62 is provided as indicated for accommodating a latching element 64 as the key 26 is moved manually in a left hand direction. The recess 62 defines a latching shoulder 66 which may cooperate with an edge 68 formed on the latching element 64. A cam surface is formed along the under side of the body portion 36 as shown at 67 over which the edge 68 of the latching element 64 is caused to ride as the key 26 is shifted in a left hand direction, the latching element 64 rotating a predetermined amount in a counterclockwise direction to permit this camming action to take place.

The latching element 64 is shown more particularly in Figure 10 and it is comprised of a pivot bar 70 transversely situated with respect to the housing side walls 10 and 14 and pivoted thereon within the housing side walls 10 and 14 at 72 and 74. The latching element 64, as best seen in Figure 2, is characterized by a generally channel-shaped cross section. When the key 26 is moved in a left hand direction, the latching element 64 is received within the recess 62 and the edge 68 of the latching element 64 engages the shoulder 66 of the key 26 to hold the latter in a left hand position until the latching element 64 is released. When the latching element 64 is released, the spring 58 urges the key 26 toward a retracted position, a suitable rubber bumper 75 being carried by the wall 30 to cushion the retracting motion of each key. A tension spring 76 is interposed between one side 78 of the latching element 64 and the end plate 18 for normally biasing the latching element 64 in a clockwise direction about the pivot bar 70, as viewed in Figure 2.

A spring subassembly is designated in Figures 1 and 2 by numeral 80 and it is secured to the top side of the end wall 30. The spring assembly 80 includes four spring elements 82, 84, 86 and 88 respectively engaging the keys 20, 22, 26 and 28. Each of the keys is formed with a detent for cooperating with the respective spring elements, the detent for the reverse key being shown in Figure 2 at 90. As the reverse key 26 is moved in the left hand direction, the spring element 86 rides over the detent 90 and resists a retracting movement of the key until a sufficient force is applied in a right hand direction to the key body portion 36 to overcome the spring force of the spring element 86. Each of the keys is somewhat similar in construction to the reverse key 26, and they will be more particularly described with reference to Figures 3 through 7.

Figure 9:
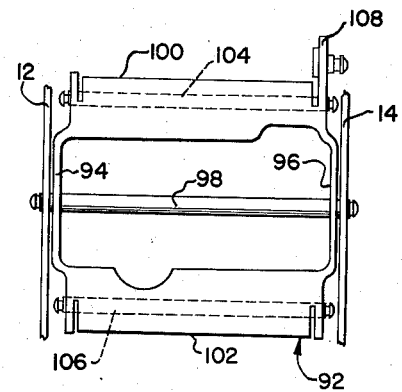
Figure 9 is a subassembly view showing a shiftable lever or cradle forming a portion of the selector mechanism, the keys of Figures 3 through 7 being adapted to engage and adjustably position the same.
Figure 6:
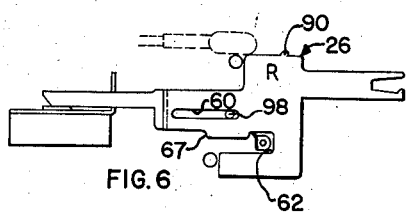

A cradle member is designated in Figures 1 and 2 by numeral 92 and the details thereof may best be understood by referring to Figure 9. It may be seen that the cradle member 92 is comprised of a pair of side members 94 and 96 which are pivotally mounted on a pivot bar 98, the latter extending transversely through the housing in a direction parallel to the above mentioned pivot bar 70. The pivot bar 98 is supported by each of the side walls 12 and 14 of the housing 10 to provide support for the cradle member 92. The top and bottom members 100 and 102 interconnect the side members 94 and 96 thereby defining a substantially rectangular structure mounted for rotation about the bar 98. By preference, a bar 104 is carried adjacent the top member 100 and is supported by the side members 94 and 96. Similarly, another bar 106 is carried adjacent the bottom member 102 and is end supported by the side members 94 and 96, the bars 104 and 106 being substantially equidistant from the pivot bar 98. An extension 108 is carried by the cradle member 92 adjacent the upper member 100 and it is adapted to accommodate a connection with a motion transmitting cable 110 as best seen in Figure 2. The cable 110 is preferably a Bowden cable and it extends to a movable valve element of the transmission to effect manual adjustments of the same to condition the transmission mechanism for a preselected shift sequence. The cable 110 is supported by a bracket 112 secured to the housing 109 as best seen in Figure 1, a suitable grommet 114 being provided for this purpose. The cable 110 comprises an outer shroud 116 which surrounds a relatively movable wire 118.

As schematically illustrated in Figure 1A, the extremity of the Bowden cable 110 may be connected to a crank 120 which may be connected to the movable transmission control valve element above mentioned. The crank 120 is pivotally mounted on the exterior of a transmission housing shown at 122, said transmission housing including a gear reduction portion 124, a hydrokinetic portion 126 and a tail shaft portion 128. The transmission may be connected in a conventional manner to the crankshaft of an internal combustion engine shown in part at 130.

A parking brake push bar is designated in Figure 2 by numeral 132 and it comprises a manually engageable depending portion 134 and a horizontal slide portion 136. The slide portion 136 may be slidably mounted in the bottom of the side walls 12 and 14 of the housing 10 to accommodate a longitudinal movement between two extreme positions as indicated in Figure 2 by dotted lines, one extreme position being designated by reference character 132' and the other being designated by reference character 132". By preference the mounting means for the push bar 132 includes rollers 137 carried at each transverse side of the horizontal portion 136 by a bracket shown in part at 138, said rollers operating within longitudinal slots 139 formed in an adapter 141 carried by each of the side walls 12 and 14 of the housing 10. A cable 140 may be secured to the horizontal bar portion 136 and it may extend through a suitable shroud 142 to a parking brake mechanism of the transmission for operating the latter in a conventional manner. The cable 140 may be supported by a bracket 144 secured to the end wall 18 of the housing 10. The push bar 132 cooperates with the park key 24 as will subsequently become apparent from an inspection of Figure 7.

Referring next to Figures 3 through 7 it will be apparent that each of the keys is formed with an extension adapted to carry an associated push button and with another extension on the opposite side adapted to be slidably received through the end plate 18. Also, each of the keys comprises a body portion defining a pair of longitudinally spaced shoulders corresponding to the above described shoulders 38 and 40 on the reverse key 26 previously described. When the push button associated with each key is depressed, the longitudinally spaced shoulders engage the bars 102 and 104 of the cradle 92 thereby rotatably positioning the latter about the pivot bar 98. The relative spacing between the longitudinally spaced shoulders for each key is different from the corresponding spacing for any of the other keys. Therefore, each key is adapted to adjustably position the cradle 92 to a separate angular position.

Each of the keys is further provided with a recess corresponding to the above described recess 62 of the reverse key 26 for receiving the common latching element 64, said element 64 maintaining the keys in a cradle engaging position upon being depressed by the vehicle operator. Also each of the keys is formed with a cam surface 67 on the reverse key 26. It will thus be apparent that when any one of the push buttons is depressed, the associated key will move in a left hand direction causing the cam element 64 to ride over the associated cam surface and to latch the key in a cradle engaging position after the cradle has assumed the adjusted position determined by the relative spacing of the longitudinally spaced shoulders. When a second push button is depressed, the key associated with the second push button will cause the latching element 64 to rotate in a counterclockwise direction as it rides over the cam surface associated with the second key thus causing the first key to become released. The first key will then be urged in a right hand direction by the compression spring associated therewith. Each separate spring associated with the keys 20, 22, 24 and 28 corresponds to the above described spring 58 for the reverse key and they are identified in Figure 1 by numerals 146, 148, 150 and 152 respectively.

Each key is further provided with a longitudinally extended slot corresponding to the above described slot 60 for the reverse key 26. The pivot bar 98 for the cradle 92 is received through each of these longitudinal slots as indicated thereby preventing interference between the keys and the cradle 92.

Figure 7:
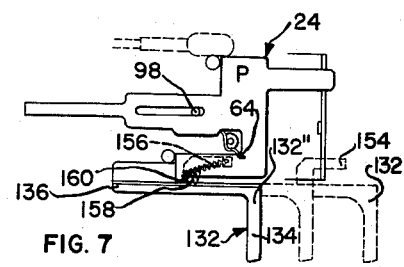

Referring next to Figure 7, the slide bar 136 carries an anchor element 154 and the tension spring 156 is interposed between the anchor element 154 and the key 24 to permit a relative restrained movement of the push bar 132 to the position designated by numeral 132' after the key 24 is returned to a fully retracted position. The slide bar 136 also carries an abutment 158 which is adapted to engage a mating shoulder 160 on the bottom side of the key 24 so as to adjustably position the key 24 toward the engaged position designated by the numeral 132".

The push bar 132 is used in lieu of a push button for adjusting the park key 24 since it often happens that a greater effort is required to release the parking brake than to merely adjustably position a transmission control valve. The depending portion 134 of the push bar 132 permits the vehicle operator to exert the required retracting force to the park key 24 if this proves to be necessary.

It is further apparent from an inspection of Figures 3 through 7 that each of the keys is formed with a detent shoulder corresponding to the above described shoulder 90 of the reverse key 26. The detent shoulders associated with the keys 20, 22 26 and 28 cooperate with the spring elements 82, 84, 86 and 88 respectively to hold the keys in an engaged position following a manual adjustment of a second key until the second key causes the cradle member 92 to assume a newly adjusted position as determined by the longitudinally spaced shoulders for the second key. When the cradle member 92 is so positioned, it will exert a retracting force on the first key thereby overcoming the spring effort of the detent spring element associated with the first key. If, for example, the vehicle operator desires to shift the transmission from "reverse" range to "drive" before accelerating, the reverse push button will maintain a depressed position until the transmission control valve has conditioned the transmission for forward drive.

Figure 8:
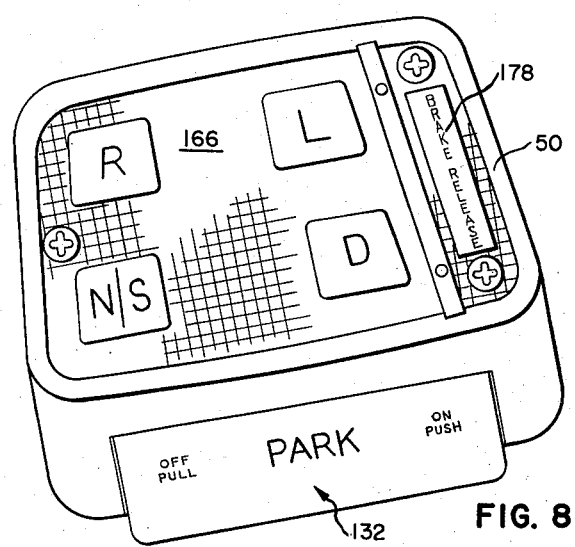
Figure 8 is an end view of the selector mechanism of our instant invention showing the push buttons associated with each of the respective keys, together with their relative positions.

Referring next to Figure 8 the arrangement of the push buttons within the shroud 50 as viewed from the interior of the vehicle passenger compartment is shown. By preference, the various push buttons illustrated in Figure 8 are comprised of a plastic body surrounded by a metal sleeve as best seen in Figure 2, the plastic portion being identified by numeral 162 and the metal sleeve being designated by numeral 164. The ends of the keys 20, 22, 26 and 28 are preferably bifurcated and received within the plastic body to provide a permanent connection between these parts. A suitable face plate 166 may be positioned at the front side of the mechanism to provide a pleasing appearance, said face plate defining in part a cavity 168 within which an instrument panel light may be mounted if desired for the purpose of illuminating the plastic push buttons, although such a light is not shown in the drawings. Similarly, a light 170 may be mounted on the exterior of the housing 10 between the side wall 14 and the emergency brake key 34 as illustrated in Figure 1, said light 170 being retained within a suitable socket 172 secured to the extension 32 of the rear wall 18 of the housing 10. A plastic, light conducting element 174 is situated adjacent the light 170 and retained in place by a suitable bracket 176 and it is effective to conduct light through an opening 177 in the extension 30 of the front housing wall 16 for the purpose of illuminating the brake release button 178 as shown in Figure 8, said button 178 being carried by the forked end of the brake release key 34.

Referring again to Figures 1 and 2, a right angle bracket 180 is secured to the end wall 18 of the housing 10 and it is adapted to carry a switch mechanism generally designated by numeral 182. The switch mechanism 182 includes a first movable element 184 operatively connected to a pair of electrical contact elements contained in a suitable switch housing 186, said movable element 184 being situated in the line of movement of the reverse key 26. A cam surface 188 is formed on the movable element 184 and the extension 54 of the key 26 is adapted to engage the cam surface 188 of the element 184 to depress the latter when the reverse key 26 assumes a cradle engaging position. The above mentioned contact elements form a portion of an electrical circuit for the vehicle back up lights.

In addition, we have also provided a second pair of electrical contact elements within the switch housing 186, and a second movable switch element 190 is operatively associated with the second contact elements, said switch element 190 being positioned in the line of movement of the neutral key 28. The element 190 is also provided with a cam surface 192 which is adapted to be contacted by the end of the key 28 when the latter is shifted to the neutral position.

The element 184 is arranged with respect to the key 28 so that it comes in contact with the key 28 when the cradle 92 reaches a neutral position. Upon further movement of the key 26 beyond the neutral position to a longitudinal limiting position with the shoulders 38 and 40 in engagement with the bars 104 and 106 of the cradle 92, the movable element 90 is depressed thereby closing the second contact elements within the switch housing 186. The second contact elements form a portion of the vehicle engine starter solenoid circuit, a portion of the wiring associated with the starter solenoid circuit and the reverse back up light being generally designated by numeral 194. It is thus apparent that the vehicle operator may start the engine merely by depressing the push button associated with the neutral key through the neutral stage, the other push buttons thereby being automatically released during the travel of the neutral key to automatically disengage the transmission from any of the operating drive ranges. Operation of the neutral key during starting also releases the parking key, but if additional force is required to retract the parking mechanism the vehicle operator may pull on the push bar 132 as above described.

The park and reverse keys may be rendered inoperative at speeds above a predetermined value by a locking mechanism generally designated in Figure 2 by numeral 196. This mechanism 196 includes a substantially rectangular shaped bracket 198 having two transverse sides as shown in Figure 1 at 200 and 202. The sides 200 and 202 are preferably fixed to the above mentioned bracket 180 and the end wall 32 of the housing 10 by suitable shoulders as indicated. A pair of longitudinally spaced wall portions of the mechcanism 196 is shown at 204 and 206 and they are joined to the transverse side walls 200 and 202 to define a partly closed enclosure within which is positioned an electrical solenoid element 208. The wall portions 204 and 206 overlap the solenoid 208 to provide a means of support for the latter.

The lever 210 is positioned on the side of the mechanism 196 and is pivoted on the wall portion 204 as indicated at 212, one end 214 of the lever 210 being adapted to move with respect to the wall portion 206. A spring 215 is interposed between the lever 210 and an anchor element 217 carried by the wall portion 204 for normally biasing the lever 210 in a counterclockwise direction about the pivot 212. The core 216 of the solenoid element 208 is situated in close proximity to the lever 210 intermediate the wall portions 204 and 206.

The other end of the lever 210 is formed with a pair of transversely spaced abutment portions 218 and 220 which are respectively situated in the plane of the parking key 24 and the reverse key 26 when the lever 210 is in the position indicated in Figure 2. The parking key 24 and the reverse key 26 may be moved with respect to the housing 10 by the vehicle operator in the manner above described without interference. However, when the solenoid element 208 is energized, the lever 210 is caused to pivot in a clockwise direction as viewed in Figure 2 thereby causing the abutment portions 218 and 220 to move in a downward direction into the line of movement of the park key 24 and the reverse key 26 respectively. With the solenoid element 208 thus energized, the park push button and the reverse push button may not be depressed by the vehicle operator thereby rendering it impossible to shift the transmission into reverse or park.

Since it is desirable to render the park and reverse keys inoperative only at vehicle speeds greater than a predetermined limiting value, it is necessary that the electrical signal supplied to the solenoid element 208 be a function of vehicle speed. Accordingly, we have mounted a suitable transmission tail shaft driven electrical governor in the transmission tail shaft housing 128, as schematically indicated in Figure 1A at 222, and have electrically connected the power output terminals of the same to the lead wires 224 of the solenoid element 208. By preference the electrical governor 222 may include a voltage responsive switch for closing the circuit of the solenoid element 208 at vehicle speeds above five to seven m.p.h. and for opening the circuit at lower speeds. This permits the vehicle operator to alternately shift the transmission from forward to reverse under emergency conditions and it also prevents the vehicle operator from inadvertently shifting the transmission to park or reverse during operation of the vehicle under road conditions.

Having thus described the principal features of our instant invention, what we claim and desire to secure by United States Letters Patent is:

1. In a multiple speed power transmission mechanism for an engine powered wheeled automotive vehicle including gear elements capable of transmitting power from a vehicle engine to the vehicle traction wheels, gear control means for controlling the motion of said gear elements to accommodate a torque delivery through said mechanism, a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, push buttons carried by each key member to facilitate manual movement of the latter in one direction into engagement with said cradle member, each key member being adapted to adjustably position said cradle member to a separate angular position with respect to said frame, a vehicle speed responsive governor mounted on a driven portion of said transmission mechanism, a motion limiting means for preventing relative movement between said frame and one of said key members including a movable stop member shiftable into and out of the line of reciprocation of said one key member, an actuator element acting on said stop member to adjustably position the same, and an operative connecting means for transmitting a vehicle speed signal from said governor to said actuator element to energize the latter when the vehicle speed exceeds a predetermined value.

2. The combination as set forth in claim 1 wherein said motion limiting means comprises a solenoid carried by said frame, said stop member being pivotally mounted adjacent said solenoid, and wherein said governor comprises an electrical voltage generator drivably connected to a driven portion of said mechanism.

3. In a multiple speed power transmission mechanism for an engine powered wheeled vehicle including gear elements capable of transmitting power from the vehicle engine to a power output member, gear control means for controlling the motion of said gear elements to accommodate the delivery of torque through said mechanism with any of a plurality of torque multiplication ratios, a parking brake member engageable with said driven member for locking the latter to a stationary portion of said transmission mechanism, a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, a manually engageable part carried by each key member to facilitate manual movement of the same in one direction into engagement with said cradle member, said key members being adapted to adjustably position said cradle throughout a range of operative positions to selectively adjust said control means for effecting forward and reverse drive, means for transmitting the motion of said cradle member to said parking brake member during movement of said cradle member beyond said range of positions, and an other key member adapted to adjustably position said cradle beyond said range of positions to actuate said parking brake member.

4. In a multiple speed power transmission mechanism for an engine powered wheeled vehicle including gear elements capable of transmitting power from the vehicle engine to the vehicle traction wheels, said mechanism including means for braking said traction wheels, gear control means for controlling the motion of said gear elements to accommodate a torque delivery through said mechanism with any of a plurality of torque multiplication gear ratios, a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means and between said cradle member and said braking means, a plurality of key members slidably mounted in said frame for reciprocation in a direction transverse to said axis, a manually engageable part carried by each key member to facilitate manual movement of the same in one direction to engage said cradle member, one of said key members being adapted to adjustably position said cradle member to a first operative position for forward drive operation, another key member being adapted to adjustably position said cradle member to a second operative position for reverse operation, a third key member being adapted to adjustably position said cradle member to a third operative position to effect engagement of said braking means, a latch member pivotally mounted adjacent said other key member and said third key member, means for actuating said latch member to move the latter into and out of the line of movement of said other key member and said third key member, and a vehicle speed sensitive governor means capable of supplying a vehicle speed signal for energizing said actuating means at speeds greater than a predetermined value.

5. In a multiple speed power transmission mechanism for an engine powered wheeled vehicle including gear elements capable of transmitting power from the vehicle engine to the vehicle traction wheels, gear control means for controlnig the motion of said gear elements to accommodate torque delivery through said mechanism with any of a plurality of torque multiplication gear ratios, a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, push buttons carried by each key member to facilitate manual movement of the latter in one direction to engage said cradle member, one of said key members being adapted to adjustably position said cradle member for forward drive operation, another key member being adapted to adjustably position said cradle member for reverse operation, a latch member pivotally mounted adjacent said other key member, means for actuating said latch member to move the latter into and out of the line of movement of said other key member, and a vehicle speed sensitive governer means capable of supplying a vehicle speed signal for energizing said actuating means at speeds greater than a limiting value thereby preventing a shift from forward drive to reverse drive during operation at vehicle speeds greater than said limiting value.

6. In a multiple speed, power transmission mechanism for an engine powered, wheeled vehicle including gear elements capable of transmitting power from the vehicle engine to a power output member, gear control means for controlling the motion of said gear elements to accommodate the delivery of torque through said mechanism with any one of a plurality of torque multiplication ratios, a parking brake mechanism including a portion engageable with said driven member for locking the latter to a stationary position of said mechanism, a gear selector means for adjusting said mechanism to condition the same for torque delivery and for operation in any of a plurality of gear ratio ranges, said gear selector means including a frame, a cradle member pivotally mounted in said frame for rotation about an axis of oscillation, a mechanical connection between said cradle member and a portion of said gear control means, a plurality of keys slidably mounted in said frame for reciprocation in a direction transverse to said axis, a manually engageable part carried by each key to facilitate manual movement of the same in one direction into engagement with said cradle member, said keys being adapted to adjustably position said cradle throughout a range of operative positions to selectively adjust said control means for effecting forward and reverse drive, and means for transmitting the motion of said cradle member to said parking brake means to actuate the latter upon movement of said cradle member to a preselected position, another of said keys being adapted to adjust said cradle to said preselected position.

7. In a multiple speed power transmission mechanism for an engine powered, wheeled vehicle including gear elements capable of transmitting power from the vehicle engine to the vehicle traction wheels, gear control means for controlling the motion of said gear elements to accommodate the delivery of torque through said mechanism, a gear selector means for adjusting said mechanism to adapt the same for operation in any of a plurality of gear ratio ranges, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, each key member having a manually engageable part to facilitate manual movement thereof in one direction into engagement with said cradle member, one of said key members being adapted to adjustably position said cradle member to a first angular position with respect to said frame to effect forward drive operation, another of said key members being adapted to adjustably position said cradle to a second operating position to effect reverse drive operation, a vehicle speed responsive governor mounted on a driven portion of said transmission mechanism, a motion limiting means for preventing relative movement between said frame and said other key member, and means for transmitting a vehicle speed signal from said governor to a portion of said motion limiting means to energize the latter when the vehicle speed exceeds a preselected value.

8. In a multiple speed power transmission mechanism for an engine powered, wheeled vehicle including gear elements capable of transmitting power from the vehicle engine to the vehicle traction wheels, said mechanism including means for braking said traction wheels, gear control means for controlling the motion of said gear elements to accommodate a torque delivery through said mechanism with any of a plurality of torque multiplication gear ratios, a gear selector means for adjusting said mechanism to adapt the same for operation in any of a plurality of ranges of gear ratios, and gear selector means including a frame, a cradle member pivotally mounted in said frame for rotation about an axis of oscillation, a mechanical connection between said cradle member and a portion of said gear control means and between said cradle member and said braking means, a plurality of key members slidably mounted in said frame for reciprocation in a direction transverse to said axis, each key member having a manually engageable part to facilitate manual movement of the same in one direction to engage said cradle member, one of said key members being adapted to adjustably position said cradle member to a first operative position for forward drive operation, another key member being adapted to adjustably position said cradle member to a second operative position for reverse operation, a third key member being adapted to adjustably position said cradle member to a third operative position to effect engagement of said braking means, a motion limiting means for preventing movement of said other key member and said third key member, and a vehicle speed sensitive governor means connected to a portion of said motion limiting means, said governor means being capable of supplying a vehicle speed signal to said motion limiting means for energizing the latter at vehicle speeds greater than a predetermined value.

9. In a multiple speed power transmission mechanism for an engine powered, wheeled vehicle including gear elements capable of transmitting power from the vehicle engine to the vehicle traction wheels, said mechanism including means for braking said traction wheels, gear control means for controlling the motion of said gear elements to accommodate a torque delivery through said mechanism with any of a plurality of torque multiplication gear ratios, a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means and between said cradle member and said braking means, a plurality of key members slidably mounted in said frame for reciprocation in a direction transverse to said axis, each key member having a manually engageable part to facilitate manual movement of the same in one direction to engage said cradle member, one of said key members being adapted to adjustably position said cradle member to a first operative position for forward drive operation, another key member being adapted to adjustably position said cradle member to a second operative position for reverse operation, a third key member being adapted to adjustably position said cradle member to a third operative position to effect engagement of said braking means, a latch member pivotally mounted adjacent said other key member and said third key member, means for actuating sad latch member to move the latter into and out of the line of movement of said other key member, a governor element drivably connected to a driven portion of said mechanism and a connection between said governor element and a portion of said actuating means, said connection being adapted to transmit a vehicle speed sensitive signal to said actuating means to energize the latter at speeds greater than a predetermined value.

10. In a multiple speed power transmission mechanism for an engine powered, wheeled vehicle including gear elements capable of transmitting power from the vehicle engine to the vehicle traction wheels; gear control means for controlling the motion of said gear elements to accommodate the delivery of torque through said mechanism, a gear selector means for actuating said control means to adapt said mechanism for operation in any of a plurality of gear ratio ranges, said gear selector means including a frame, a cradle member pivotally mounted in said frame for rotation about an axis of oscillation, mechanical motion transmitting elements defining an operator controlled motion transmitting path extending to a portion of said gear control means for actuating the latter, a plurality of key members slidably mounted in said frame for reciprocation in a direction transverse to said axis, each key member being adapted to engage and to adjustably position said cradle member upon movement thereof in one direction relative to said frame to its respective operating position, one of said key members being adapted to adjustably position said cradle member to a first operative position for effecting forward drive operation, another key member being adapted to adjustably position said cradle member to a second operating position for effecting reverse operation, one of said motion transmitting elements being connected with said cradle member for movement therewith, said one key member and said other key member each forming one of said motion transmitting elements and separately cooperating with said cradle member to partly define said motion transmitting path, and a motion inhibiting means for preventing movement of said motion transmitting elements to a reverse drive position, said motion inhibiting means including a stop element adapted to be moved into and out of the line of movement of an element of said motion transmitting path, a governor connected to a driven portion of said mechanism and capable of producing a vehicle speed sensitive signal, and means for connecting said governor to said motion inhibiting means for actuating the latter and for moving said stop element to a motion inhibiting position at speeds greater than a predetermined value.

11. In a multiple speed power transmission mechanism for an engine powered, wheeled vehicle including gear elements capable of transmitting power from the vehicle engine to the vehicle traction wheels; gear control means for controlling the motion of said gear elements to accommodate the delivery of torque through said mechanism, a gear selector means for adjusting said mechanism to adapt the same for operation in any of a plurality of gear ratio ranges, said gear selector means including a frame, a cradle member pivotally mounted on said frame for rotation about an axis of oscillation, a mechanical connection between said cradle member and a portion of said gear control means, a plurality of key members pivotally mounted in said frame in a direction transverse to said axis, each key having a manually engageable part to facilitate manual movement thereof in one direction into engagement with said cradle member, one of said key members being adapted to adjustably position said cradle member to a first operating position with respect to said frame to effect forward drive operation, another of said key members being adapted to adjustably position said cradle to a second operating position to effect reverse drive operation, a portion of each key separately forming an element of a motion transmitting path between its associated manually engageable part and a portion of said gear control means, said cradle member and said mechanical connection forming other elements of said motion transmitting path, a vehicle speed responsive governor connected to a driven portion of said transmission mechanism, a motion inhibiting means for preventing an inadvertent movement of said portion of said gear control means to a reverse operating position including a stop element movable into and out of the line of movement of an element of said motion transmitting path, and means for transmitting a vehicle speed signal from said governor to a portion of said motion inhibiting means to energize the latter when the vehicle speed exceeds a preselected value whereby said stop element is moved into a motion inhibiting position.

References Cited in the file of this patent

UNITED STATES PATENTS

| | | |
|---|---|---|
| 1,809,778 | Evans | June 9, 1931 |
| 2,296,061 | Schwarz et al. | Sept. 15, 1942 |
| 2,335,812 | Steffens | Nov. 30, 1943 |
| 2,610,518 | Goedeke et al. | Sept. 16, 1952 |
| 2,670,064 | Hasbany | Feb. 23, 1954 |